United States Patent [19]

Perrotta

[11] Patent Number: 5,194,874
[45] Date of Patent: Mar. 16, 1993

[54] SATELLITE ANTENNA TRACKING SYSTEM
[75] Inventor: Giorgio Perrotta, Rome, Italy
[73] Assignee: Selenia Spazio S.p.A., L'Aquila, Italy
[21] Appl. No.: 677,623
[22] Filed: Mar. 28, 1991
[30] Foreign Application Priority Data
  Mar. 28, 1990 [IT] Italy .............................. 47798 A/90
[51] Int. Cl.$^5$ .............................................. H01Q 3/00
[52] U.S. Cl. .................................... 343/757; 343/761; 343/763
[58] Field of Search ............... 343/757, 758, 759, 761, 343/763, 765; 342/352, 359

[56] References Cited
U.S. PATENT DOCUMENTS

| | | | |
|---|---|---|---|
| 2,934,763 | 4/1960 | Hopkins | 343/758 |
| 2,954,554 | 9/1960 | Feltham, Jr. | 343/757 |
| 3,745,582 | 7/1973 | Karikomi et al. | 343/758 |

Primary Examiner—Rolf Hille
Assistant Examiner—Hoanganh Le
Attorney, Agent, or Firm—Cohen, Pontani, Lieberman, Pavane

[57] ABSTRACT

An integrated antenna system for signal error tracking and correction capable of performing a mechanical conical scan. The mechanical conical scan imposes a modulation upon a received RF signal. This modulation is in turn imposed on an AGC circuit in the receiver of the antenna system, which modulates the AGC signal of the receiver in accord with the modulation imposed on the RF signal by the conical scan. This modulated AGC signal is compared in a detector circuit to a reference sinusoidal signal generated by a local oscillator in the system. This detector circuit outputs an error signal which is added to a reference sinusoidal signal which in combination drive an actuator. This actuator is responsible for imparting nutative motion to the antenna, for the purposes of producing the conical scan pattern. The error detection and correction which result from the conical scan and the error detection circuitry, are capable of operating at multiple RF frequencies and modulation schemes, since the error signal of the system is generated by a modulated AGC signal as opposed to the modulated RF signal itself.

9 Claims, 3 Drawing Sheets

SATELLITE ANTENNA TRACKING SYSTEM

FIELD OF THE INVENTION

The present invention relates to a system for accurately pointing tracking antennas found in satellite communications. The system is designed for an antenna using the mechanical conical scan method of tracking. The antenna system uses a modulated automatic gain control signal to control error circuitry which generates signals which can drive an actuator which governs the movement of the antenna. The system can effectively sense directional errors in the antenna and correct these pointing errors utilizing the same circuitry and the same actuator, eliminating the need for separate error sensing and error correcting equipment in the antenna.

BACKGROUND OF THE INVENTION

Mechanical conical scanning techniques for antenna tracking systems have been in use for many years. A typical implementation for a mechanical conical scanning antenna system is where the antenna is of the Cassegrain type. In the Cassegrain configuration a subreflector is rotated at high speed so as to obtain a mechanical conical nutation within a certain angle of rotation which defines the scan region covered by the antenna beam. The conical scan can determine errors in the positioning of the antenna, since the amplitude of the received signal will be modulated by the mechanical nutation imparted by the rotating subreflector. When, through the nutative movement, an optimal position has been determined for the antenna, a separate device, typically an elevation over azimuth actuator is used to finally position the antenna structure. This is most commonly used in ground based applications since the inertial characteristics of ground based antenna do not warrant movement of the entire antenna structure in a nutative fashion to impart the conical scan. It is therefore necessary to provide separate electronic subsystems and separate physical rotative subsystems to impart the mechanical conical scan and tracking error detection in the systems that are known today.

Other scan techniques are the sequential lobing method or monopulse methods. In these systems the nutation is provided by a moving RF signal from the antenna feed. This also requires separate systems for error detection and correction. In both cases the actuator is typically of the elevation over azimuth type.

Therefore it would be greatly advantageous to integrate the actuating function which performs the error detection, and the actuating function which provides the signal error correction in a simple, single mechanism. Such an integrated system would find particular application in space based satellites where inertial characteristics are less critical than in ground based antennae.

OBJECTS AND SUMMARY OF THE INVENTION

The present invention relates to a tracking system for an antenna which is capable of performing a mechanical conical scan. Mechanical conical scanning techniques have been known in the art, and are typically used for detecting positional errors in the pointing of the antenna. In the present invention, the antenna subsystems which detect and correct these pointing errors are the same, therefore providing improved design economy and greater flexibility in the application of the antenna to a variety of uses.

The antenna, which comprises a reflector and an antenna feed, is mounted upon an actuator which is capable of moving the antenna in two directional planes around two axes.

When the antenna is made to mechanically nutate in a conical scan pattern, if any error is present in the directional positioning or pointing of the antenna with relation to the signal, the signal being received by the antenna will modulate as a result of the nutative movement of the conical scan. This received signal is sent to a receiver in the antenna system. The receiver contains an Automatic Gain Control (AGC) circuit. This AGC circuit will generate an AGC signal which is modulated proportionately with the RF signal modulation imparted by the conical scan of the antenna. This modulating AGC signal is compared to a local reference sine wave signal, and an error signal is generated when AGC signal modulation is present. The error signal is in turn fed to the actuator which drives the antenna, which causes the actuator to drive the antenna in a direction such that the error signal is minimized or eliminated. Hence the same actuator and control circuits are used when the antenna is seeking a signal, that is at the commencement of nutative movement, as well as when the antenna has found a signal and is correcting its position relative to that signal, that is when the nutative movement is brought under control and final directional positioning of the antenna takes place.

It is therefore an object of this invention to provide an antenna system capable of performing a mechanical conical scanning function wherein the control circuit and mechanical means which enables the mechanical conical scan are the same whether said antenna is seeking a signal or is repositioning itself after having found a signal.

It is a further object of this invention to provide a system which may be readily modified by providing standard subcomponents in the antenna system which remain the same regardless of the receiver or antenna feed selected.

It is a further object of this invention to provide a conical scanning antenna system wherein a single RF sensor can be used for signal reception as well as tracking error detection and correction.

It is a further object of this invention to provide an antenna system capable of error tracking and correction with a reduced number of subcomponents.

It is a further object of this invention to provide an antenna system particularly well suited for satellite applications due to the savings in weight realized by the reduction of system components required to perform error tracking and correction.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PREFERRED EMBODIMENTS

Figure 1:
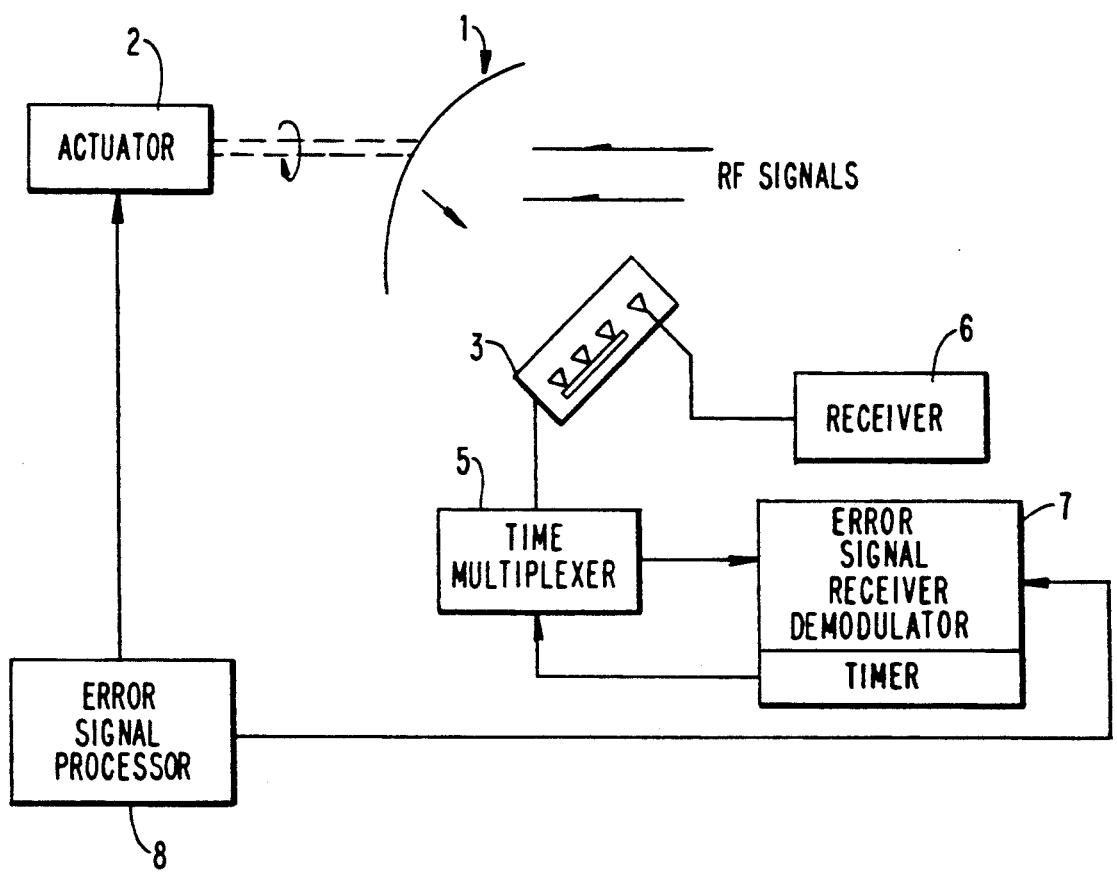
FIG. 1 is a box diagram representation of an error tracking and correcting antenna system known in the prior art.

With initial reference to FIG. 1, there are known in the art antenna systems capable of detecting Radio Frequency (RF) signal errors caused by erroneous positioning of the antenna relative to the signal source to be received. In such prior art systems, the complexity of the antenna is increased by the necessity for the antenna feed to accommodate not only reception of the RF signal for which the antenna is designed, but the sensor system must also be compatible with signals which are commonly used for error detection and correction such as electronic side lobe scanning or monopulse signals. This results in suboptimized performance on the RF communication channel the antenna is used for. As can be seen in FIG. 1, which is representative of the prior art, the need for multiple RF sensors and separate multiplexing circuitry 5 and error signal receiving and demodulation circuitry 7 is required to create an error signal which is fed to an error signal processor 8. The nutative movement of the antenna to perform seeking is accomplished by electrically nutating the RF signals at the antenna feed (using sequential lobing or monopulse techniques). The error is corrected by feeding error signals to an actuator, commonly of the elevation over azimuth type. This requires separate subsystems for nutating (seeking) and error correction, a problem eliminated by the present invention. Further, since each of these components is essentially narrow band, the use of such configuration in multiband communication systems would be practically impossible unless as many sets of device components as system operating frequency bands are required are implemented. This would have a considerable negative impact in terms of system weight, power consumption and reliability, factors which are particularly disadvantageous when antenna systems are being designed for satellite applications.

Also, the acquisition field within which signals to be carried may be searched out is narrower in these systems due to the RF characteristics of the sensors used, either in monopulse or sequential lobing systems.

Figure 2:
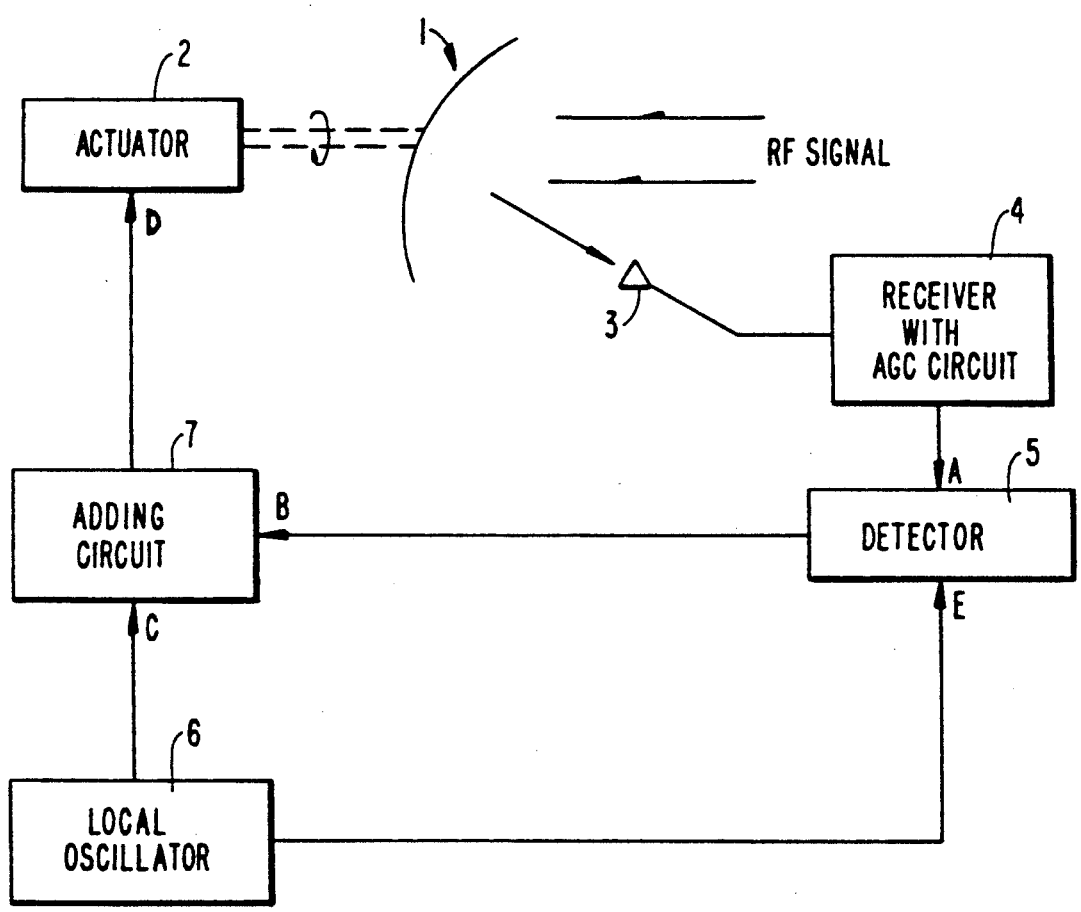
FIG. 2 is a box diagram representation of the antenna system of the present invention.

As can be seen in FIG. 2, the system of the present invention requires a single RF sensor 3, receiver 4 and a single actuator 2 to implement signal error detection and correction. Signal error detection and correction in the present invention is implemented as follows. The antenna 1 is movably mounted on an actuator 2 which is capable of movement in two directions along two separate axes. The actuator 2 can move the antenna 1 in a nutative fashion, causing the antenna beam to move in a conically shaped pattern resulting in what is known in the art as a conical scan. Actuator 2 is fed an actuating signal D from adding circuit 7. Adding circuit 7 generates actuating signal D by adding an error signal B received from detector 5 and a sinusoidal signal C received from local oscillator 6. Local oscillator 6 provides an extremely low frequency sine wave (corresponding to the scan rate of the conical scan), in the order of less than 10 Hertz (Hz) and preferably in the order of 0.1 to 0.5 Hz. If no error signal B is present in the adding circuit 7, the only signal received by actuator 7 is the sinusoidal signal C emitted by local oscillator 6. The actuator signal D causes actuator 2 to impart nutative movement to the antenna 1. This nutative movement causes the antenna to scan in a conical pattern. This can be considered the error detection or seeking mode, that being when no RF signal has yet been received by the antenna 1, or the RF signal being received falls outside certain parameters. When an RF signal is received while the conical scan is being conducted, the received signal will have a modulation imposed upon it by the conical scan as a result of the nutational movement of the antenna. This modulated RF signal is fed to the receiver 4. Receiver 4 contains an Automatic Gain Control (AGC) circuit of a type commonly known in the art. Since the RF signal received by the antenna is modulated, the RF signal modulation envelope will be imposed upon the AGC signal. This modulated AGC signal is fed to detector 5. The AGC voltage will modulate at the conical scan rate at which the antenna is being nutated, with an amplitude corresponding to the signal strength of the received RF signal. It is preferable that the conical scan rate be performed at a frequency lower than 10 Hz, preferably within the range of approximately 0.1 to 0.5 Hz.

Local oscillator 6 signal E is fed to detector 5 along with the modulated AGC signal. These signals are then compared and processed and an error signal B is generated which is fed to an adding circuit 7. Local oscillator 6 also feeds sinusoidal reference signal C to adding circuit 7. Adding circuit 7 combines the error signal B with the local oscillator reference sinusoidal signal C. Adding circuit 7 generates the actuating signal D which feeds actuator 2 which governs the antenna 1 movement. The detector 5 generates an error signal such that when the error signal B and reference sinusoidal signal C are added together it causes the actuator to modify the nutational movement in such a way as to seek to minimize the modulation on the RF signal and in turn the modulation imposed on the AGC signal of receiver 4. This signal error correction takes place by gradually modifying the nutational movement imposed by actuator 2 on antenna 1 and thereby gradually narrowing the conical pattern of conical scan until the antenna reaches a point where there is no modulation on the RF signal, at which point nutational movement ceases. As can be seen from the previous description, when no RF signal is received, the antenna will be conically scanning at its maximum rate until an RF signal is received, at which point the modulation of the RF signal causes the nutational movement to gradually modify itself until the modulation disappears and nutation ceases altogether.

Therefore, the same antenna subsystems control the nutative movement of the antenna, both during seeking and during final positioning, eliminating the need for separate, specialized components.

The signal sensing function is performed by the same RF sensor 3 and receiver 4 that is used for RF information processing on the particular RF channel which the antenna is designed to operate at, thereby allowing optimization of the RF sensor for the frequency selected. However, should it be necessary to change the operating frequency, it is only necessary to modify the sensor 3 and receiver 4. This is true since the AGC signal implementation is very common, and therefore the detector 5, adding circuit 7 and oscillator 6 and actuator 2 are operated independently of the RF frequency at which sensor 3 and receiver 4 are designed to operate. Since these components are non-RF components, they are easier to maintain, simpler to design, and less expensive to operate. Also the antenna configuration of the present invention is extremely flexible since the RF characteristics can be readily changed without modifying the control system, therefore making it useful for a number of different RF applications with relatively simple modification.

When nutational movement is imposed on antenna 1, by actuator 2, the conical scan imposed will create a conical pattern which revolves around an imaginary axis known as the scan axis. Also, as is commonly known in the art, a typical RF antenna has a beam width which is developed around an imaginary axis known as the beam axis of the antenna. It is very common to refer to the −3db beamwidth. This −3db beamwidth is referred to as a particular angle. When conical scanning takes place, the conical scan axis and the antenna beam axis are at some given angle to each other as these axes rotate in space relative to each other. The angle at which the scan axis and the beam axis lie during conical scanning is referred to as the semiaperture angle or squint angle. It is preferable, due to the low scanning frequency of the system of the present invention that this angle be kept within a range of approximately between 1/20th and 1/10th of the antenna −3db beamwidth. However, during the initial nutative movement or the error detection phase of the conical scanning process, the angle may be increased to values corresponding to approximately 1/5th ½ of the −3db beamwidth, by adaptive techniques commonly known in the art.

As previously mentioned, the ability to adapt the parameters of the mechanical scan of the antenna to commonly known techniques, and the ability of the system to operate in multiple RF applications provides great advantages and flexibility in the application of such an antenna system. The error detection and correction methodology used in the present invention can be used in RF applications regardless of signal modulation schemes. This is true so long as such modulation schemes do not have significant spectrum components within the narrow band closely related in frequency to the mechanical conical scan. The RF signal received may be, for instance, a frequency modulated analog or phase modulated digital signal, a multicarrier signal such as frequency division multiplex (FDM) with any modulation within each carrier (analog or digital), a single side band modulated signal (so long as the lower end of the voice band is far higher than the mechanical scan frequency), a multicarrier signal with random access and expanded spectrum modulation, etc.

An application which is considered considerably well suited for the use of the system of the instant invention is in intersatellite RF communication links in the centimeter and millimeter wavelength bands. Typically in such intersatellite connections, the antennas have reduced dimensions (from 0.5 meters to 2 meters) and the dynamics of the relative motion among satellites are characterized by low angular speeds. The inventive system is also considered useful for establishing RF connections between satellites in synchronous orbit and mobile terminals on earth, operating in the centimeter and millimeter wavelength bands which are either stationary or moving.

Figure 3:
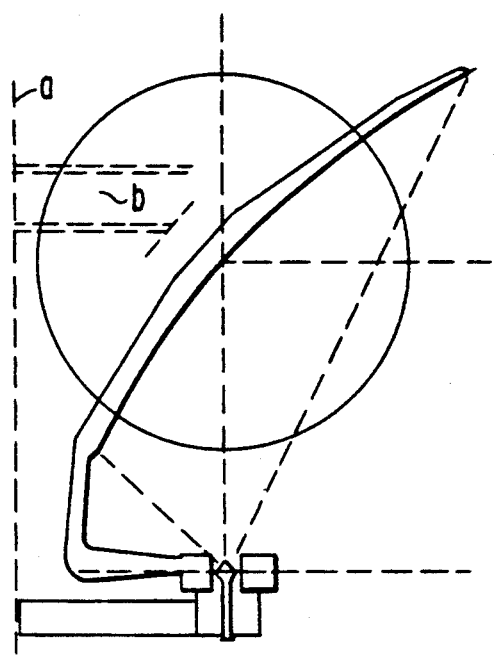
FIG. 3 is a representation of one possible implementation of the present invention, namely an offset feed configuration.
Figure 4:
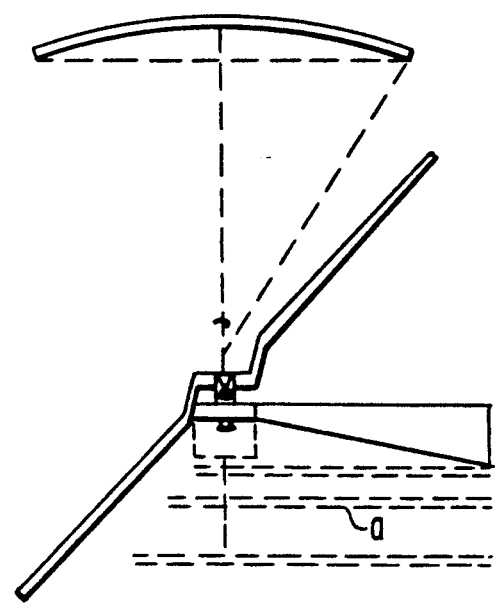
FIG. 4 is another possible implementation of the present invention, namely an offset reflector configuration.

Two illustrative configurations of such an antenna system are shown in FIGS. 3 and 4.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, however, therefor, to be limited only as indicated by the scope of the claims appended hereto.

What is claimed is:

1. An integrated antenna system for the control of antenna tracking comprising:
   a movable antenna for receiving radio frequency (RF) signals having a signal strength, said antenna being mechanically movable for variable nutative movement in a variable conic pattern of a mechanical conical scan;
   an actuator connected to said antenna for imparting said variable nutative movement to said antenna;
   a receiver connected to said antenna for receiving said RF signal from said antenna, said receiver comprising means for generating an Automatic Gain Control (AGC) signal related to the signal strength of an RF signal received by said antenna;
   a local oscillator for supplying a sinusoidal reference signal;
   an error detector connected to said receiver and said local oscillator, said error detector comprising means for comparing the AGC signal from the receiver and the sinusoidal reference signal from the local oscillator and for generating an error signal in response to the comparing of the AGC signal from the receiver and the sinusoidal reference signal from the local oscillator; and
   an adding circuit connected to said actuator and said local oscillator and said error detector, said adding circuit comprising means for adding said sinusoidal reference signal from said local oscillator and said error signal from said error detector and for generating therefrom an actuating signal that varies in direct relation to said error signal, said actuating signal being supplied to said actuator for controlling said nutative movement of said antenna.

2. The system according to claim 1, wherein said mechanical conical scan is performed at a frequency of less than 10 Hertz.

3. The system according to claim 2, wherein said mechanical conical scan is performed at a frequency having a range between approximately 0.1 to 0.5 Hertz.

4. The system according to claim 1, wherein said antenna has an antenna beam defined around a beam axis, said antenna beam having a −3 db beamwidth defined around said beam axis, and further comprising a scan axis around which said conical pattern of said conical scan is defined around a scan axis.

5. The system according to claim 4, wherein said scan axis and said beam axis define an angle of less than approximately 1/10th said −3 db beamwidth of said antenna.

6. The system according to claim 4, wherein said angle defined between said scan axis and said beam axis has a range between approximately 1/20th and 1/10th said −3 db beamwidth of said antenna.

7. The system according to claim 4, wherein said angle defined between said scan axis and said beam axis has a range between approximately 1/5th and ½ said −3 db beamwidth of said antenna.

8. The system according to claim 1, wherein said antenna comprises an antenna feed for supplying RF signals to said antenna, and a reflector for reflecting said RF signals in a predetermined pattern, said antenna feed being attached to said reflector.

9. The system according to claim 8, wherein said antenna feed is mechanically independent of said reflector.

* * * * *